United States Patent [19]
Doherty, Jr.

[11] 4,068,800
[45] Jan. 17, 1978

[54] THERMALLY RESPONSIVE VALVE ASSEMBLY

[75] Inventor: John Doherty, Jr., Assonet, Mass.

[73] Assignee: Texas Instruments Incorporated, Dallas, Tex.

[21] Appl. No.: 732,280

[22] Filed: Oct. 14, 1976

Related U.S. Application Data

[63] Continuation of Ser. No. 600,337, July 30, 1975, abandoned, which is a continuation of Ser. No. 428,569, Dec. 26, 1973, abandoned.

[51] Int. Cl.² ............................................ G05D 23/10
[52] U.S. Cl. ............................... 236/101 C; 236/48 R; 236/87; 123/117 A
[58] Field of Search ................... 236/101 C, 101 E, 81, 236/87, 48 R; 337/343; 251/75; 137/468; 123/117 A

[56] References Cited

U.S. PATENT DOCUMENTS

| 2,471,655 | 5/1949 | Rundell | 236/93 X |
|---|---|---|---|
| 2,861,151 | 11/1958 | Moore | 337/343 |
| 3,319,888 | 5/1967 | Creager | 236/87 |
| 3,506,194 | 4/1970 | Resseguie | 236/87 |
| 3,704,697 | 12/1972 | Weymann | 123/117 A |
| 3,729,132 | 4/1973 | Ludwig | 236/101 C |
| 3,790,077 | 2/1974 | Wisyanski et al. | 236/87 |
| 3,804,326 | 4/1974 | McIntire | 236/92 |
| 3,856,259 | 12/1974 | Doherty, Jr. | 236/48 R |
| 3,930,613 | 1/1976 | Place | 236/87 |

*Primary Examiner*—William F. O'Dea
*Assistant Examiner*—Henry C. Yuen
*Attorney, Agent, or Firm*—John A. Haug; James P. McAndrews

[57] ABSTRACT

A thermally responsive valve assembly comprising a two-portion valve body, one portion of which includes two nipples each having a passage therein. One of the nipples extends generally axially of the valve body and the other nipple extends generally perpendicularly to the first nipple with the passage in one of the nipples constituting an inlet passage and with the passage in the other nipple constituting an outlet passage with communication between the passages within the first portion of the valve body, and with one of the passages having a valve seat. Valve means are provided in the valve body for movement into and out of engagement with the valve seat, thereby selectively to block communication between the passages. The valve means comprises a dish-shaped thermostatic disk which is responsive to variations in temperature and changes in curvature from a first position in which the disk is bowed away from the valve seat and a second position in which the disk is bowed toward the valve seat. Spring means bias the disk towards the valve seat when the disk is in its closed position and apply a force to the valve disk sufficient to maintain it in closed engagement with the valve seat. The first portion of the valve housing also includes an abutment against which the disk reacts to effect movement thereof from its closed to its open position. The second portion of the valve body is made of a thermally conductive material and is adapted for heat-exchange relation with an object, such as an automobile engine, for transferring heat to or from the disk to increase or decrease the temperature thereof in response to a corresponding increase or decrease in temperature of the object. In a second embodiment of this invention, the disk is modulatable for movement toward and away from the valve seat so as to smoothly vary the flow rate through the valve seat as the temperature of the disk varies.

6 Claims, 5 Drawing Figures

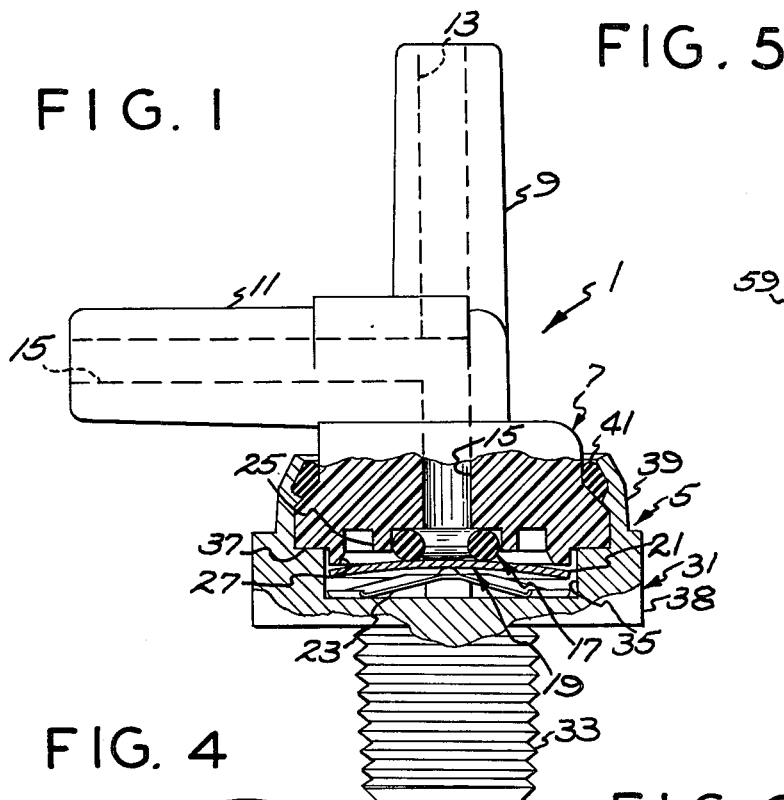
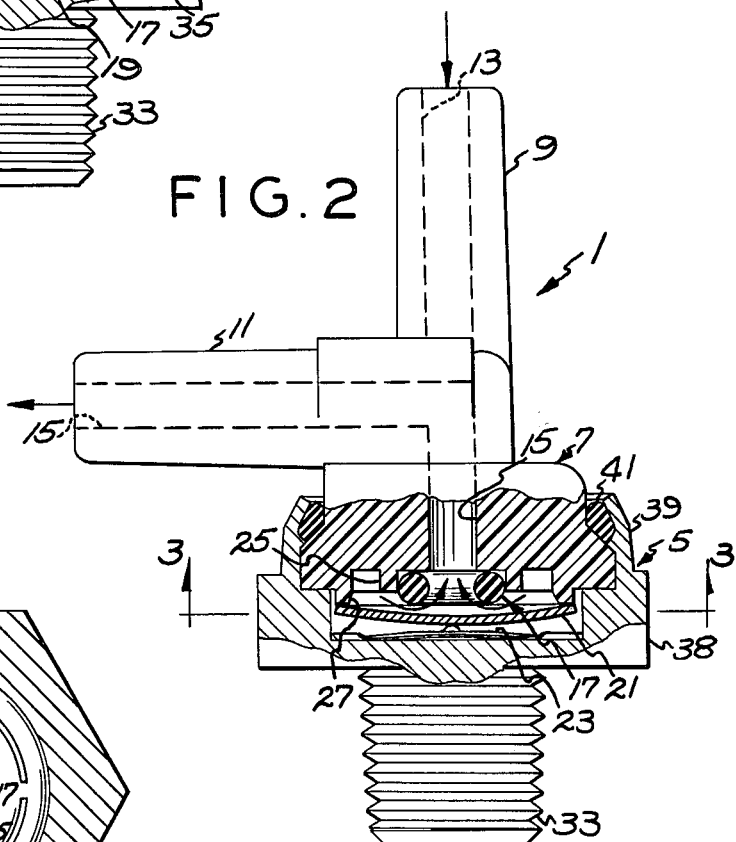
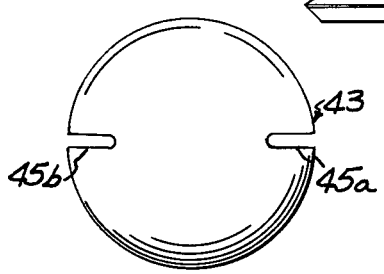
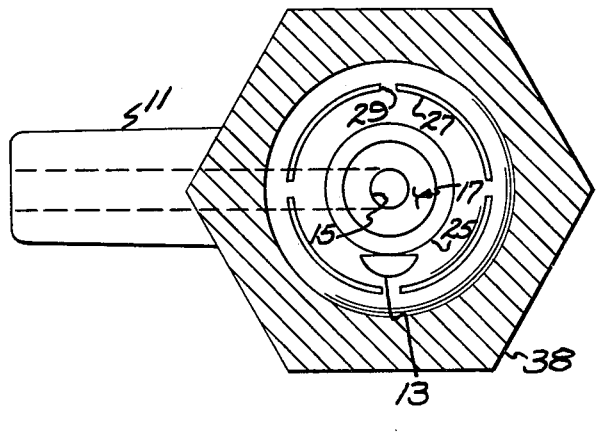

THERMALLY RESPONSIVE VALVE ASSEMBLY

This is a continuation, of application Ser. No. 600,337, filed July 30, 1975 now abandoned which was a continuation of Ser. No. 428,569 filed Dec. 26, 1973, now abandoned.

BACKGROUND OF THE INVENTION

This invention relates to a thermally responsive valve assembly and more particularly to such a valve assembly which in one embodiment is specifically adapted to be positioned in heat-transfer relation with an object (e.g., an automobile engine block) to open and close the valve upon increase or decrease in temperature, and which in another embodiment smoothly controls the flow rate of fluid through the valve upon increase or decrease of the temperature thereof.

The thermally responsive valve assembly of this invention is particularly adapted for use in an emission gas recirculation control system, such as used on automotive engines, to vent or block a vacuum system upon the engine attaining a desired operating temperature. The valve of this invention may be used in place of a solenoid valve which requires an electric circuit for energization and which is more expensive.

SUMMARY OF THE INVENTION

Among the several objects of this invention may be noted the provision of a thermally responsive valve assembly which is of compact size and to which two pieces of tubing or the like may be readily connected to one end of the valve assembly; the provision of such a valve assembly which may readily be installed in good heat-transfer relation with an object; the provision of such a valve assembly which avoids deleterious compression of elastomeric valve means; the provision of such a valve assembly which in another embodiment smoothly controls the flow rate therethrough in response to a variation in temperature; and the provision of such a valve assembly which is economical to manufacture, easy to install, and reliable in operation. Other objects and features of this invention will be in part apparent and in part pointed out hereinafter.

Briefly, a thermally responsive valve assembly of this invention comprises a two-part valve body, the first part having a first nipple extending generally axially of the valve body and an adjacent second nipple extending generally perpendicularly relative to the first nipple. These nipples are adapted for ready connection to fluid lines. An inlet passage in one of the nipples and an outlet passage in the other of the nipples are in communication with one another within the valve body. One of the passages has a valve seat therein. Valve means movable into and out of engagement with the valve seat selectively block communication between the passages. The valve means comprises a generally circular dish-shaped thermostatic disk responsive to a variation in temperature to change its curvature from a first position in which the disk and the valve means are moved away from the valve seat to a second position in which the disk is bowed toward the valve seat and the valve means are closed against the seat. Spring means biases the disk toward said valve seat when the disk is in its last position thereby to apply sufficient force thereto to maintain the valve means closed against the seat. Abutment means are provided spaced from the disk when it is in its last said position and against which the disk reacts to effect movement thereof into the first said position. The valve body includes a thermally conductive portion adapted for heat exchange with an object, such as an automobile engine, for transferring heat to or from the disk to increase or decrease the temperature of the disk in response to a corresponding increase or decrease in the temperature of the object.

A second embodiment of a thermally responsive valve assembly of this invention comprises a valve body having an inlet passage and an outlet passage with communication therebetween and with one of the passages having a valve seat. Valve means are provided movable into and out of engagement with the valve seat thereby selectively to block communication between the passages. The valve means comprises a generally dish-shaped thermostatic bimetal disk responsive to a variation in temperature to change its curvature from a first position in which the disk is bowed away from the valve seat and in which the valve means are open relative to the valve seat to a second position in which the disk is bowed toward the valve seat and the valve means are closed against the seat. Spring means bias the disk and the valve means towards the seat when the disk is in its last said position thereby to supply sufficient force thereto to maintain the valve means biased against the seat. Abutment means are provided spaced from the disk when it is in its last said position and against which the disk reacts to effect movement thereof into the first position, the disk being modulatable for movement of the valve means towards and away from the valve seat so as to smoothly vary the flow rate through the valve seat as the temperature of the disk varies.

BRIEF DESCRIPTION OF THE DRAWINGS

FIG. 1 is a side view of a thermally responsive valve assembly of this invention with parts broken away showing a thermostatic disk in its closed position in sealing engagement with a valve seat;

FIG. 2 is a view similar to FIG. 1 with the disk in its reverse-curvature or open position;

FIG. 3 is a horizontal sectional view taken on line 3—3 of FIG. 2;

FIG. 4 is a plan view of a modulatable thermostatic disk installable in a valve assembly of this invention; and FIG. 5 is a longitudinal sectional view of a second embodiment of a thermally responsive valve assembly of this invention having a modulatable thermostatic disk.

Corresponding reference characters indicate corresponding parts throughout the several views of the drawings.

DESCRIPTION OF THE PREFERRED EMBODIMENTS

Referring now to the drawings, a thermally responsive valve assembly of this invention is indicated in its entirety at 1 and is shown to include a two-part valve body 5. The first part of the valve body, as indicated at 7, is preferably a one-piece molding of a synthetic thermosetting resin. This first part has a first nipple 9 extending generally axially of the valve assembly and a second adjacent nipple 11 extending at right angles to the first nipple. This arrangement of the nipples enables tubing (not shown) to be readily connected to the nipples while permitting the valve assembly to be of a compact size with the valve nipples entering and exiting the valve body from the same side thereof. Nipple 9 has a passage 13 therethrough and nipple 11 has a passage 15 therethrough, with communication between the passages within the valve housing. As shown, passage 13 constitutes an inlet passage and passage 15 constitutes an outlet passage, but it will be understood that fluid (e.g., air) may enter the valve body via passage 15 and may exit via passage 13. Passage 13 has an O-ring, as generally indicated at 17, constituting a valve seat. This O-ring is preferably of a suitable resilient synthetic or natural rubber. Valve means, as indicated at 19, is movable into and out of engagement with the valve seat thereby to selectively block communication between the passages.

More particularly, valve means 19 comprises a generally circular dish-shaped thermostatic bimetal disk 21 responsive to a variation in temperature to change its curvature from a first position (see FIG. 2) in which the disk and the valve means are moved away from valve seat 17 to a second position (see FIG. 1) in which the disk is bowed toward the valve seat and in which the center of the disk is in sealing engagement with the valve seat. As shown in FIG. 1, disk 21 is disposed with its low expansion side up so that the disk is normally in its closed position and that upon heating of the disk to a predetermined temperature, thermal stresses in the disk will cause it to abruptly snap over center to its open position. As the disk cools below another predetermined temperature, it snaps back to its closed position. A three-arm spider spring washer 23 engages the center of the disk and biases it towards valve seat 17 when the disk is in its second or closed position thereby to apply sufficient force thereto to maintain the disk closed against the seat. It will be understood that spring 23 exerts a sufficient force on disk 21 to maintain it closed against O-ring 17, but does not apply excessive compressive forces thereto which may cause the elastomeric O-ring to permanently deform (i.e., undergo a permanent compression set) and result in leakage.

The first housing part 7 has a circular shoulder 25 currounding outlet passage 15, this shoulder constituting a retainer for O-ring 17. A second circular shoulder 27 surrounds shoulder 25 and is spaced therefrom. This second shoulder extends toward disk 21 and is of a diameter slightly smaller than the plan diameter of the disk so that the outer margins of the disk abut thereagainst as the disk snaps over center from its closed to its open position, thereby to cause the center of the disk 45 to move clear of O-ring 17. Thus shoulders 27 constitute abutment means for the disk. As shown in FIG. 3, inlet passage 13 opens into the space between shoulder 25 and shoulder 27 so that, with the disk 21 in its open position, fluid (e.g., air) may flow from passage 13 over O-ring 17 and into passage 15 (this flow being indicated by the arrows in FIG. 2) located at the center of the O-ring. Shoulder 27 is notched, as indicated at 29 (see FIG. 3) to permit pressure to equalize on both sides of the disk to prevent the disk from becoming sealingly engaged by shoulders 27.

The second part of two-part valve housing 5 is generally indicated at 31 and is shown to comprise a cup-shaped member adapted to be sealingly secured to body part 7. More particularly, second body part 31 comprises a member of a thermally conductive material, such as brass, having a threaded stud 33 and a recess 35 therein for reception of body portion 7, disk 21 and spring 23. Recess 35 has a stepped shoulder 37 therein against which the bottom portion of valve body part 7 bears when the two body parts are assembled. Spring 23 is interposed between the bottom of recess 35 and the bottom face of valve part 7 with disk 21 supported by the spring. Body part 31 has a hex-shaped portion 38 enabling the valve assembly 1 to readily be inserted in the threaded hole and also has a relatively thin wall 39 extending upwardly from the hex-shaped portion. A sealing gasket 41 (e.g., an O-ring) is disposed between valve body part 7 and wall 39 and the wall is adapted to be rolled over on the O-ring to sealingly secure the two valve parts together to form valve body 5.

Valve body part 31 is particularly adapted to be threaded into an object, such as an automotive engine block or the like, to transfer heat from the engine block to disk 21 so as to heat the disk in response to a corresponding temperature increase of the engine block. Upon cooling of the engine block, the disk will be maintained at approximately the temperature of the engine.

With valve assembly 1 installed in a cold engine and with disk 21 in its closed position thus preventing the flow of air from inlet passage 13 to outlet passage 15, a vacuum system may be maintained at a relatively low pressure. As the automotive engine warms up, heat is conducted from the stud portion 33 so as to heat disk 21. As the disk approaches a predetermined temperature it snaps over center from its closed position to its open position. As the disk snaps over center, th outer periphery of the disk engages shoulders 27 and abuts thereagainst causing the center portion of the disk to move away from O-ring 17. With the disk in its open position, air may enter inlet passage 13 and flow into outlet passage 15. This flow of air may be used to vent the vacuum system or to effect actuation of components in a vacuum-controlled emission gas recirculation system in an automobile.

Thus, the valve 1 as described above has a simple, inexpensive and reliable construction. That is, the body part 31, which is formed of thermally-conducting metal to rapidly transfer heat between an object whose temperature is to be monitored and the bimetal disk 21, is of simple construction which is easily manufactured at low cost. On the other hand, the more complex features of the valve such as the valve passages are incorporated in the body part 7 formed of a synthetic material which is easily manufactured at low cost by molding or the like. Further, the molding of the body part 7 to incorporate the shoulder 27 against which the perimeter of the bimetal disk abuts assures that the shoulder 27 is accurately located relative to the valve seat in an inexpensive manner. In addition, in the construction of the valve as above described, where the shoulder abutment 27 surrounds the open ends of both of the valve passages 13 and 15, fluid flows freely between these open passage ends at one side of the bimetal disk when the disk is in its open valve position, thereby assuring that the fluid flow is unobstructed by the disk or by any contaminants caught inside the valve.

A modification of bimetal disk 21 is shown in FIG. 4, this modified disk being indicated in its entirety at 43 to distinguish it from disk 21. As shown, a pair of diametrically opposed slits 45a, 45b extend from the peripheral edge of the disk inwardly toward the center of the dome-shaped disk, but terminate short of the center thereof. These slits cause a variation in the thermally induced stress patterns in the bimetal disk upon heating of the disk, thus causing the disk to move relatively smoothly between its first and second curvature positions. More particularly, the slits prevent disk 43 from moving abruptly (i.e., snapping) over center, and thus cause the center portion of the disk to move gradually toward and away from O-ring 17 thereby to smoothly modulate the flow through the valve assembly. It will be understood that the movement of the disk may be nonlinear, but it does not snap over center. Generally, disks which are structued so as to smoothly move between reverse-curvature positions may be referred to as modulatable disks. It will be understood that any desired number of slits may be formed in disk 43, preferably these slits being equally angularly spaced therearound.

In FIG. 5, a modification of valve assembly 1 is shown, this modified valve assembly being indicated in its entirety at 47. This modified valve assembly has a valve body 49 having a cup-shaped inlet portion 51 and an outlet portion 53 sealingly secured together with inlet portion 51 having a plurality of openings 55 and outlet portion 53 having a nipple 57 with an outlet passage 59 therethrough. An interior wall 61 separates the inlet and outlet portions and has a port 63 therein at its center and a peripheral rim consituted by shoulder 65 extending into inlet portion 51. A thermostatic bimetal modulatable disk 67, generally similar to disk 43, is provided in the inlet portion. Disk 67 is biased toward wall 61 by means of a wave spring washer 69. A circular ridge 71 surrounds port 63 and constitutes a valve seat. The valve means includes a resilient flexible pad 73 of a suitable somewhat resilient material, such as a synthetic rubber secured to the face of disk 67 adjacent port 63. This pad is held in place by means of a button 75 insertable through a hole 77 in disk 67. This button is integral with pad 73 and initially may have an elongate tab (not shown) which is readily insertable through hole 77 and which may be stretched so as to pull button 75 through the hole. After the button has been inserted through hole 77, the button may then be cut from the pad. It will be understood that operation of valve assembly 47 is generally similar to operation of valve assembly 1 heretofore described, and thus need not be described in detail. It will also be understood that port 61 with its ridge 71 and pad 73 consititute valve means for blocking communication between the inlet and outlet passages of the valve housing. This valve means may also be utilized in the embodiment shown in FIG. 1 in place of O-ring 17 and disk 21.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A thermally responsive valve assembly comprising a valve body molding of a synthetic material and a thermally conductive metal valve body member, said metal valve body member being cup-shaped with an open-ended recess therein, having said synthetic valve body molding secured to said metal valve body member in said open recess end to form a chamber therebetween, and having an externally threaded portion on said metal valve body member for use in mounting the valve assembly, the synthetic valve body molding having a first nipple and an adjacent second nipple for connection to fluid lines, having an inlet passage in one of said nipples and an outlet passage in the other of said nipples, and having one end of each of said passages disposed in side-by-side relation to each other at one side of the chamber opening into said chamber, a valve seat within said chamber extending completely around said one end of one of said passages, an abutment on the synthetic body molding at said one side of the chamber defining at least part of a ring encompassing both of said one passage ends, a valve member comprising a generally circular dish-shaped thermostatic bimetal disk responsive to a variation in temperature to change its curvature from a first position in which said disk is bowed away from said valve seat and in which said valve member is open relative to the valve seat to a second position in which the disk is bowed toward the valve seat and the valve member is closed against said seat, said dish-shaped bimetallic disk having a central portion and a perimeter and being disposed within said valve body chamber with said disk perimeter alighed with said abutment and with said central portion aligned with said valve seat with one side of said dish facing both of said one passage ends, and spring means bearing against said metal valve body member and said bimetallic disk biasing said valve member toward said seat when the disk is in said second position thereby to supply sufficient force thereto to maintain the valve member closed against said seat, said disk having a plurality of slits therein spaced at equal angular intervals around the disk and extending inwardly from the outer periphery of the disk but terminating short of the center to vary the thermal stresses in said disk as the disk is heated and cooled, said disk being modulatable for movment toward and away from said valve seat to cause the disk to move between its first and second positions without snapping over center thereby to gradually block and unblock said valve seat and to smoothly vary flow rate through the valve seat as the temperature of the disk varies.

2. A thermally responsive valve assembly compising a body molding of a synthetic material and a thermally conductive metal valve body member, said metal valve body member being cup-snaped with an open-ended recess therein, having said synthetic valve body molding secured to said metal valve body member in said open recess end to form a chamber therebetween, and having an externally threaded portion on said metal valve body member for use in mounting the valve assembly, the synthetic valve body molding having a first nipple and and adjacent second nipple for connection to fluid lines, having an inlet passage in one of said nipples and an outlet passage in the other of said nipples, and having one end of each of said passages disposed in side-by-side relation to each other at one side of the chamber opening into said chamber, a valve seat within said chamber extending completely around said one end of one of said passages, an abutment on the synthetic body molding at said one side of the chamber defining at least part of a ring encompassing both of said one passages ends, a valve member comprising a generally circular dish-shaped thermostatic disk responsive to a variation in temperature to move with snap action between a first dished curvature and an inverted dished curvature, said dish-shaped bimetallic disk having a central portion and a perimeter and being disposed within said valve body chamber with said disk perimeter aligned with said abutment and with said central portion aligned with said valve seat with one side of said disk facing both of said one passage ends, and spring means bearing against said metal valve body member and said bimetallic disk to bias said disk into engagement with said seat while said disk has said inverted curvature, thereby to apply sufficient force to said bimetallic disk to normally maintain said central disk portion against the valve seat to close communication between said valve passages while permitting said disk perimeter to engage said abutment to move said central disk portion away from said valve seat against said spirng bias to permit fluid flow between said valve passages at said one side of said disk when said disk moves to said first curvature in response to temperature change.

3. A valve assembly as set forth in claim 2 wherein said valve seat comprises a resilient, flexible ring surrounding said outlet passage, said disk being sealingly engageable with said ring when the disk is in its second position, said disk thus constituting said valve means.

4. A valve assembly as set forth in claim 3 wherein said disk is adapted to abruptly move over center from its first to its second curvature position upon said disk attaining a first temperature level and to abruptly move over center from its second to its first curvature position upon attaining a second temperature level and wherein said abutment means is spaced from said disk when the latter is in its second curvature position and is engageable with the outer margins of said disk as the latter snaps over center from its second position to its first position, the outer margins of said disk reacting against said abutment means and thus causing the center of the disk to move clear of the valve seat as the disk moves to its first position.

5. A valve assembly as set forth in claim 4 wherein said spring means is engageable with said disk at the center thereof.

6. A valve assembly as set forth in claim 2 wherein said valve seat is an integral part of said synthetic valve body molding.

* * * * *